United States Patent [19]

Eicken et al.

[11] Patent Number: 5,786,308

[45] Date of Patent: Jul. 28, 1998

[54] FLOW CONTROLLERS FOR POWDER LACQUERS

[75] Inventors: Ulrich Eicken, Korschenbroich; Brigitte Hase, Erkrath; Herbert Fischer, Duesseldorf; Paul Birnbrich, Solingen; Heinz-Guenter Schulte, Muelheim; Wolfgang Gress, Wuppertal; Harald Frommelius, Monheim, all of Germany

[73] Assignee: Henkel Kommanditgesellschaft auf Aktien, Duesseldorf, Germany

[21] Appl. No.: 687,552

[22] PCT Filed: Jan. 30, 1995

[86] PCT No.: PCT/EP95/00310

§ 371 Date: Aug. 27, 1996

§ 102(e) Date: Aug. 27, 1996

[87] PCT Pub. No.: WO95/21894

PCT Pub. Date: Aug. 17, 1995

[30] Foreign Application Priority Data

Feb. 8, 1994 [DE] Germany .................. 44 03 953.0

[51] Int. Cl.$^6$ .................................................. C08G 59/00
[52] U.S. Cl. ............................. 528/403; 528/408; 528/271; 525/410; 525/540
[58] Field of Search ..................... 528/403, 408, 528/271; 525/410, 540

[56] References Cited

U.S. PATENT DOCUMENTS

| | | | |
|---|---|---|---|
| 3,458,456 | 7/1969 | Levy et al. | 260/2 |
| 3,470,267 | 9/1969 | Litt et al. | 260/857 |
| 3,574,784 | 4/1971 | Litt et al. | 260/823 |
| 4,584,352 | 4/1986 | Beaudoin | 525/410 |
| 5,047,259 | 9/1991 | Oberkobusch et al. | 427/27 |
| 5,130,440 | 7/1992 | Krause et al. | 548/239 |
| 5,240,744 | 8/1993 | Hase et al. | 427/388.1 |

FOREIGN PATENT DOCUMENTS

| | | |
|---|---|---|
| 315856 | 5/1989 | European Pat. Off. |
| 0355676 | 2/1990 | European Pat. Off. |
| 2261315 | 9/1975 | France |
| 1904540 | 1/1970 | Germany |
| 3421525 | 12/1984 | Germany |
| 3914155 | 10/1990 | Germany |
| 51-134727 | 11/1976 | Japan |

OTHER PUBLICATIONS

"Ring Opening Polymerization", Ed. K.J.Ivin, T.Segusa, vol. 2, , London, Elsvier, 1984, pp. 761–790.

Cyclic 1,3–Oxaza Compounds, S. Kobayashi and T. Saegusa, Department of Synthetic Chemistry, Chapter 11, pp. 761–791.

*Primary Examiner*—Duc Truong
*Attorney, Agent, or Firm*—Ernest G. Szoke; Wayne C. Jaeschke; Daniel S. Ortiz

[57] ABSTRACT

A new group of polymer flow controllers for powder resin lacquer is provided. The polymer flow controllers contain groups a)

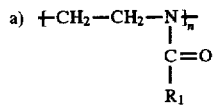

and/or b)

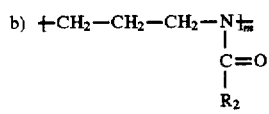

wherein n and m are numbers from 0 to 1000 with the sum of n+m=2–1000 and $R_1$ and $R_2$ are independently hydrogen, an optionally hydroxy substituted hydrocarbon group containing 1 to 36 carbon atoms aryl and aralkyl optionally substituted in the aromatic nucleus, or $R_3$—(—O—$C_2H_4$—)—$_p$O—$CH_2$— wherein $R_3$ is an alkyl or alkenyl group containing 1 to 18 carbon atoms and p is a number of 1 to 10.

19 Claims, No Drawings

FLOW CONTROLLERS FOR POWDER LACQUERS

FIELD OF THE INVENTION

This invention relates to flow controllers for powder lacquers containing polymers with oxazoline and/or oxazine monomer units and to processes for their production.

BACKGROUND OF THE INVENTION

Low-solvent or solvent-free coating systems are acquiring increasing significance. This group of coating systems includes powder coating, i.e. the coating of metals and plastics by application and sintering of heat-curing powders. They may be applied by rotational coating, powder spraying, fluidized-bed coating and, above all, by electrostatic coating. Thermoset powder lacquers of epoxy, polyester and acrylic resins are particularly suitable for electrostatic powder coating. Thermoplastics of polyamide, polyester, polyethylene, polyethylene vinyl acetate, polyvinyl chloride and polyepoxides are preferably used for fluidized-bed coating. Powder coating is used above all for machine parts and domestic goods (for example steel furniture). To promote the flow of the polymer powder during stoving or sintering, flow controllers are added so that any irregularities formed during application, such as streaks, bubbles, craters, orange peel structures and pinholes, are largely eliminated. Known flow controllers include acrylate copolymers. These are generally liquid polyacrylate-based products, for example the commercial products Perenol® F 40, Perenol® F 30 P mod (Henkel KGaA) or Modaflow® (Monsanto), which basically may be incorporated in the powder lacquers by two different methods:

1. A so-called master batch is prepared by melting the liquid flow controller into a binder component of the powder lacquer. The solidified melt is then size-reduced and made up for subsequent processing.
2. An inert carrier for the liquid products, for example silica, is used.

The disadvantage of master batch technology is that the formulation of powder lacquers is limited because the binder of the master batch has to be identical or at least compatible with the principal binder of the formulation.

Flow controllers applied to a carrier can lead to a reduction in the gloss of the lacquer and to a reduction in the transparency of clear lacquers and, under adverse conditions, to a deterioration in the storage stability of the powder lacquer on account of the incompatibility of the generally inorganic carrier with the lacquer film.

RELATED ART

In addition, either method gives solid flow controllers containing 100% by weight of active substance. To eliminate these disadvantages, powder-form flow controllers based on polyacrylates have been developed, more particularly for the production of clear lacquers, requiring neither an inert carrier nor a master batch process. One such flow controller is described, for example, in EP-A1 0 355 676. The disadvantage of these solid polyacrylates is that the improvement in flow obtainable with small quantities is inadequate and, although satisfactory flow properties are obtained where larger quantities are used, the resulting films are cloudy.

In addition, the softening temperatures are still so low that the flow controllers can become lumpy after prolonged storage.

Polyoxazolines are known compounds which are obtained in the polymerization of oxazolines substituted in the 2-position. The production of oxazolines substituted by long-chain alkyl groups is described, for example, in EP-A1 315 858. The cationic polymerization of oxazolines is comprehensively described, for example, by S. Kobayashi and T. Saegusa in the monograph "Ring Opening Polymerization", Ed. K. J. Ivin, T. Saegusa, Vol. 2, pages 761–790, London, Elsevier, 1984.

5,6-Dihydro-4H-1,3-oxazines substituted in the 2-position, hereinafter referred to as oxazines, are also known compounds of which the synthesis is described, for example, in DE-A1 39 14 155. The polymerization of the oxazines is described in the monograph cited above (pages 791–795).

The copolymerization of oxazolines and oxazines is also known.

Polyoxazolines are produced by living cationic polymerization. It is known that this polymerization can be carried out in standard reactors, for example glass vessels or stirred tank reactors, in the presence of suitable solvents or in the absence of solvents. Where the polymerization is carried out in the absence of solvents, the fast and highly exothermic reaction gives rise to the problem of dissipating the heat generated. This is generally done by initially introducing and polymerizing only part of the monomers and then continuously adding the rest in such a way that the heat of reaction can still be dissipated by cooling.

If phenyloxazoline is polymerized in this way, the effect of the high viscosity of the polymer melt at the polymerization temperature is that the melt can no longer be stirred in conventional units. Accordingly, the heat of polymerization cannot be dissipated, nor can the polymer formed be further processed.

The problem addressed by the present invention was to provide solid flow controllers for powder lacquers based on polymers with oxazoline and/or oxazine monomer units and containing 10 to 100% by weight and preferably 100% by weight of active substance which would be easy to incorporate in powder lacquers, would not lead to lump formation in the powder lacquer, even after prolonged storage, and would form non-cloudy or glossy films on stoving. More particularly, the problem addressed by the invention was to provide a new and more suitable flow controller for powder lacquer systems showing unsatisfactory flow properties with conventional additives.

Another problem addressed by the invention was to provide processes for the production of flow controllers for powder lacquers based on polymers containing oxazoline and/or oxazine monomer units with which it would be possible to dissipate the heat of polymerization without difficulty or to process the highly viscous polymer melts.

BRIEF DESCRIPTION OF THE INVENTION

The present invention relates to flow controllers for powder lacquers containing one or more polymers with the following monomer units:

a) 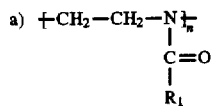

and/or b) $+CH_2-CH_2-CH_2-N+_m$
$\quad\quad\quad\quad\quad\quad\quad |$
$\quad\quad\quad\quad\quad\quad\quad C=O$
$\quad\quad\quad\quad\quad\quad\quad |$
$\quad\quad\quad\quad\quad\quad\quad R_2$ in which $R_1$ and $R_2$ independently of one another represent hydrogen and/or an optionally hydroxysubstituted hydrocarbon radical containing 1 to 36 carbon atoms and/or an aryl or aralkyl radical optionally substituted in the aromatic nucleus and/or a group corresponding to general formula I:

$$R_3-(OC_2H_5)_p-O-CH_2- \quad\quad (I)$$

where $R_3$ is an alkyl or alkenyl group containing 1 to 18 carbon atoms, more especially a methyl group, and p is a number of 1 to 10, and the indices n and m independently of one another may assume values of 0 to 1000, with the proviso that the sum of n+m is between 2 and 1000, and, if desired, other additives typically encountered in powder lacquers.

The present invention relates to a process for the production of flow controllers for powder lacquers containing polymers of the monomer units a) and/or b), in which—to produce the polymers—oxazoline and/or oxazine monomers are dissolved in an organic carrier inert to the polymerization and are subsequently polymerized for 30 minutes to 5 hours at temperatures of 80° to 180° C. by addition of a polymerization initiator; and to a process for the production of flow controllers for powder lacquers containing polymers of the monomer units a) and/or b), in which—to produce the polymers—oxazoline and/or oxazine monomers are mixed with the polymerization initiator and the resulting mixture is subsequently introduced into a heated extruder with a temperature range of 100° to 300° C., in which the mixture is polymerized and the polymer is extruded.

DETAILED DESCRIPTION OF THE INVENTION

The substituents $R_1$ and $R_2$ may be hydrogen or an optionally branched hydrocarbon radical containing 1 to 36 carbon atoms. The corresponding monomers are, for example, unsubstituted oxazolines or oxazines or methyl, ethyl, n-propyl, i-propyl, n-butyl, i-butyl, t-butyl, n-pentyl, n-hexyl, n-heptyl, 2-ethylpentyl, n-octyl, 2-ethylhexyl, n-nonyl, n-undecyl, n-tridecyl, n-pentadecyl, n-heptadecyl, i-stearyl, n-nonadecyl and n-heneicosanyl, n-tricosane, n-pentacosane, n-heptacosane, n-nonacosane oxazoline or oxazine.

The hydrocarbon radical may be OH-substituted and may represent, for example, a 5-hydroxypentyl or 11-hydroxy-8-heptadecenyl radical.

The substituents $R_1$ and $R_2$ may also be aromatic or alkyl-substituted aromatic groups, for example phenyl, naphthyl, 2-methylphenyl, 4-methylphenyl, 4-t-butylphenyl or 2-t-butylphenyl groups.

Other substituents in the aromatic nucleus, for example halogen atoms, hydroxyl groups, alkoxyl groups or nitro groups, are also possible.

In addition, the substituents $R_1$ and $R_2$ may correspond to general formula I:

$$R_3-(OC_2H_4)_p-O-CH_2- \quad\quad (I)$$

in which $R_3$ is an alkyl or alkenyl group containing 1 to 18 carbon atoms, more especially a methyl group, and p is a number of 1 to 10.

The corresponding monomers are derived from ether carboxylic acids corresponding to formula II:

$$R_3-(OC_2H_4)_p-O-CH_2-COOH \quad\quad (II)$$

which may be obtained, for example, from ethoxylated alcohols by reaction with chloroacetic acid.

The polymers according to the invention are produced from oxazoline and/or oxazine monomers or mixtures of these monomers with the same or different substituents $R_1$ and $R_2$ by cationic polymerization.

The polymers may contain between 50 and 100 mole-% of monomer units a) and between 0 and 50 mole-% of monomer units b). Polymers containing only monomer units a), i.e. polyoxazolines, are preferred.

In one advantageous embodiment of the invention, polymers containing only oxazoline monomer units, in which the substituent $R_1$ is a linear or branched, saturated or monounsaturated hydrocarbon radical containing 7 to 36 carbon atoms, more especially a linear, saturated hydrocarbon radical containing 11 to 17 carbon atoms or a phenyl group, are preferably used. The monomers of such polyoxazolines are derived from saturated or monounsaturated fatty acids of natural or synthetic origin (including technical mixtures thereof) with corresponding chain lengths or from benzoic acid.

Typical representatives of the above-mentioned natural fatty acids are caprylic, capric, lauric, myristic, palmitic, stearic, arachic, lignoceric and behenic acid and also 12-hydroxystearic and ricinoleic acid. The so-called montanic acids may also be used as starting materials for oxazoline monomers.

Homopolymers of monomer units a) may be used in accordance with the invention, although copolymers in which $R_1$ represents various groups according to the invention may also be used. A particularly preferred embodiment is characterized by the use of copolymers in which $R_1$ is a saturated alkyl radical containing 11 to 17 carbon atoms and a phenyl group.

Both statistical and block copolymers may be used. Statistical copolymers obtainable by polymerization of a mixture of the various monomers are preferably used. Block copolymers may be obtained in known manner by sequential polymerization of various types of monomers.

Physical mixtures of various polyoxazolines may also be used.

The degree of polymerization is the number of monomer units in a polymer molecule. As known to the expert, the degree of polymerization (number average) of the polymer as a whole in a cationic living polymerization derives directly from the quotient of the number of monomer molecules and the number of starter molecules. The average (number average) degree of polymerization of the polymers according to the invention, i.e. the sum total of the indices m+n, is between 2 and 1000, preferably between 5 and 25 and more preferably between 5 and 15.

Suitable initiators are any of the compounds known to the expert, for example methyl tosylate, methyl triflate, boron trifluoride or strong mineral acids, such as toluene sulfonic acid or perchloric acid. However, alkyl halides, for example methyl iodide, may also be used, optionally in combination with salts, such as lithium perchlorate.

Commensurate with the degree of polymerization, the quantities of initiator used are between 50 and 0.1 mole-%, based on the molar quantity of monomers.

The polymerization of the oxazolines or oxazines takes place by a living mechanism. i.e. the polymerization can always be continued by addition of fresh monomers. Accordingly, cationic oxazolinium or oxazinium terminal groups may be present in the polymers according to the invention. However, these terminal groups may also be reacted off with nucleophiles, such as water, OH groups or amino groups, to form covalent bonds.

The melting range of the polymers according to the invention is between 40° and 200° C. and preferably between 50° and 100° C.

In one process according to the invention for the production of the flow controllers containing polymers of monomer units a) and/or b), the monomers are dissolved in an organic carrier inert to the polymerization and subsequently polymerized. By inert is meant that the polymerization is not prevented from running its full course. Suitable inert organic carriers are, for example, fatty alcohols, preferably saturated fatty alcohols, hydrogenated castor oil or other OH-functional compounds.

The quantities of the inert organic carrier are between 10 and 200% by weight and preferably between 50 and 150% by weight, based on the oxazoline or oxazine monomer. After the monomer or monomer mixture has been dissolved in the carrier, the initiator is added and the mixture is heated in a standard reaction vessel until an exothermic reaction begins. This is generally the case at temperatures of 50° to 150° C. After the exothermic reaction has abated, the reaction mixture is if necessary heated to a temperature of 150° to 160° C. and stirred at that temperature for 3 to 5 hours to complete the polymerization.

According to the invention, the polymers of monomer units a) and/or b) may also be produced using an extruder. This is of particular advantage in the case of particularly viscous polymers based on phenyl oxazoline or copolymers containing phenyl oxazoline. To carry out the process, the monomer or the monomer mixture is mixed with the initiator. The liquid mixture is introduced into the extruder through a metering unit. The temperature of the extruder is between 100° and 300° C. It has proved to be particularly useful to increase the temperature in the extrusion screw, for example from 100° C. in the feed zone to 150° to 200° C. in the heating zone and then to 210° to 300° C. in the outlet nozzle. The polymerization takes place in the extruder. From the nozzle, the polymer is transported onto a cooling belt. The process enables even highly viscous polymers, for example polyphenyl oxazoline, to be produced and processed.

The polymers of monomer units a) and/or b) may also be produced by initially introducing part of the monomers with the total quantity of initiator into a standard stirred reactor and heating with stirring until the polymerization reaction begins. The remaining monomers are then introduced at temperatures of 120° to 180° C. and preferably at temperatures of 140° to 160° C. at such a rate that the heat of polymerization generated can be dissipated by cooling. After the addition, the reaction mixture is stirred for about 30 minutes at a temperature of around 150° C. to complete the reaction.

The polymers according to the invention are suitable as flow controllers for powder lacquers.

Powder lacquers are generally produced as follows:

The binder is intensively homogenized in a mixer with pigments, hardener and additives. Suitable additives are, above all, flow aids, fatty acid esters, such as hydrogenated castor oil, agents for preventing pinholing, such as benzoin, flatting agents, such as polyethylene waxes or silica, hardening accelerators or UV stabilizers. Depending on the application, the quantities added may be between 0.1 and 5% by weight, based on the powder lacquer. Although the additives are normally added as individual substances, it is of course possible to mix the various additives to form a single compound known as a flow aid. The quantity of polymers containing monomer units a) and/or b) in this compound may be between 10 and 100% by weight and is preferably between 20 and 80% by weight, based on the compound.

The mixture of binder, pigments and additives is extruded.

The extrudate is first roughly ground and then finely ground to form a powder lacquer ready for application.

The powder lacquers to be improved in their flow properties by the polymers according to the invention of monomer units a) and/or b) contain thermoplastic or thermoset synthetic resins and 0.1 to 2.0% by weight and preferably 0.5 to 1% by weight, based on the total weight of the powder lacquers, of one or more of the polymers according to the invention and optionally pigments and typical additives, such as hardeners, hardening accelerators and UV stabilizers. Epoxy-based powder lacquers for crosslinking with carboxyfunctional polyesters (so-called hybrid systems) and powder lacquers based on carboxyfunctional polyesters for crosslinking with triglycidyl isocyanurates are preferred. In particular, however, it is also possible to produce powder lacquers based on hydroxyfunctional polyacrylates and blocked polyfunctional isocyanates of the type commercially available as Crelan® VP LS 2995/2007 (Bayer AG). The polymers according to the invention are more suitable than other flow controllers for these powder lacquers.

The advantages of the new flow controllers lie essentially in their ready processability to powder lacquers, for example during dry blending and metering, in their relatively high stability in storage. i.e. no lump formation, and in their better flow behavior, for example not only are fish eyes, craters and pinholes avoided, the orange-peel effect is also distinctly reduced.

Above all, the polymers according to the invention provide for the production of completely streak-free clear lacquer films and glossy pigmented films.

EXAMPLES

All percentages in the Examples are by weight, unless otherwise indicated.

The products were characterized as follows:

1. The melting range was determined using a Kofler heating bench or by DSC (differential scanning colorimetry).
2. The molecular weight was determined by GPC relative to polystyrene standards.
3. The OH value was determined in accordance with DIN 53 240.

Example 1

In a 1 liter three-necked flask equipped with a stirrer, internal thermometer, dropping funnel, reflux condenser and nitrogen inlet, 90.8 g of nonyl oxazoline (0.46 mole) were mixed with 42.8 g of p-toluene sulfonic acid methyl ester (0.23 mole) and the resulting mixture was heated to 60° C. A highly exothermic reaction began, increasing the temperature to 120° C. After the exothermic reaction had abated, the reaction mixture was heated to 160° C. and another 363 g of nonyl oxazoline (1.84 mole) were added dropwise with stirring at such a rate that the temperature did not rise above 170° C. After 1 hour, the addition was terminated. The reaction mixture was then stirred for 1 hour at 160° C. The polymer was poured out onto a Teflon film and, after cooling, was ground to a yellowish powder. It had a molecular weight of 2300 (weight average) and a melting range of 59° to 93° C. (DSC).

Example 2

As in Example 1, 103.5 g of undecyl oxazoline were reacted with 42.8 g of p-toluene sulfonic acid methyl ester, after which another 414 g of undecyl oxazoline were added at 160° C. The polymer was ground to a yellowish powder. It had a molecular weight of 2600 (weight average) and a melting range of 59° to 96° C. (DSC).

Example 3

As in Example 1, 142.4 g of heptadecyl oxazoline were reacted with 42.8 g of p-toluene sulfonic acid methyl ester, after which another 570 g of heptadecyl oxazoline were added at 160° C. The polymer was ground to a yellowish powder. It had a molecular weight of 3900 (weight average) and a melting range of 50° to 94° C. (DSC).

Example 4

In a 1 liter three-necked flask equipped with a stirrer, internal thermometer, dropping funnel, reflux condenser and nitrogen inlet, 356 g of hydrogenated castor oil and 356 g of n-heptadecyl oxazoline were melted with stirring at 80° C. 21.4 g of p-toluene sulfonic acid methyl ester were added at that temperature. An exothermic reaction began immediately, increasing the temperature to 180° C. After the exothermic reaction had abated, the reaction mixture was cooled to 160° C. and stirred for another 3 hours at that temperature. The product was poured onto a Teflon film and, after cooling, was ground to a yellowish powder.

Example 5
Production of Polyoxazolines in an Extruder.

A mixture was prepared from 765.6 g of phenyl oxazoline (4.4 moles), 217.3 g of n-nonyl oxazoline (1.1 mole) and 10.3 g of p-toluene sulfonic acid methyl ester (0.055 mole). The mixture was introduced through a dropping funnel into a Brabender DSK 47/7 extruder at a rate of 10 ml/minute. The rotational speed was 20 r.p.m., the torque was 0.8 to 1N·m and the pressure was 1 bar.
Temperature profile:

| T1 | feed zone: | 130° C. |
| T2 | second heating zone: | 190° C. |
| T3 | third heating zone: | 210° C. |
| T4 | slit die: | 220° C. |

An amber-colored polymer with a viscosity of 17 Pa·s at 200° C., as measured with a cone and plate viscosimeter at a shear rate of 625 s$^{-1}$, was obtained.

Example 6

A mixture was prepared from 1331.5 g of phenyl oxazoline (9.06 moles) and 168.5 g of p-toluene sulfonic acid methyl ester. The mixture was introduced through a dropping funnel into a Brabender DSK 47/7 extruder at a rate of 10 ml/minute. The rotational speed was 20 r.p.m., the torque was 0.8 to 1N·m and the pressure was 1 bar.

Temperature profile:

| T1 | feed zone: | 130° C. |
| T2 | second heating zone: | 190° C. |
| T3 | third heating zone: | 210° C. |
| T4 | slit die: | 220° C. |

An amber-colored polymer with a viscosity of 2.6 Pa·s at 200° C., as measured with a cone and plate viscosimeter at a shear rate of 625 s$^{-1}$, and a melting range of 155° to 165° C. was obtained.

Example 7

As in Example 6, a mixture was prepared from 877.8 g of phenyl oxazoline (5.97 moles) and 222.2 g of methyl tosylate (1.19 moles) and introduced into an extruder.

An amber-colored polymer with a viscosity of 0.4 Pa·s at 200° C., as measured with a cone and plate viscosimeter at a shear rate of 625 s$^{-1}$, and a melting range of 135° to 140° C. was obtained.

Performance Test

To establish their suitability as flow controllers, the copolymers to be used in accordance with the invention were tested in the following powder lacquer systems.

A Epoxy Polyester Lacquer (Hybrid System)

A powder lacquer composition of 50 parts by weight of an epoxy resin I, 50 parts by weight of a polyester resin II and 0.5 part by weight of benzoin was mixed in the presence of 1 part by weight of the flow controller to be tested. The mixture was then extruded, granulated, ground and sieved. The powder lacquers obtained were electrostatically applied to a metal surface and stoved for 12 minutes at 180° C. The epoxy resin used was a commercial product based on bisphenol A and epichlorohydrin. The oil-free polyester resin was also a commercial product containing free carboxyl groups. The resins had the following characteristic data:

|  | I | II |
|---|---|---|
| Epoxide equivalent weight | 715–835 | — |
| Glass transition temperature °C. | — | 43–48 |
| Softening range (Kofler) °C. | 70–80 | 70–80 |
| Acid value (DIN 53402) | — | 65–80 |
| Melt viscosity Pa · s |  |  |
| (DIN 53229/160° C./cone plate) | — | 8–16 |
| (DIN 53735 21.2 N/120° C.) | Approx. 50 | — |

The stoving conditions were 5 minutes at 200° C., 8 minutes at 180° C. or 17 minutes at 165° C. (the temperatures shown relate to the object temperature).

B Polyester Lacquer

A powder lacquer was prepared as described in A from 93 parts by weight of a polyester resin (III) containing free carboxyl groups and 7 parts by weight of triglycidyl isocyanurate with addition of 1 part by weight of flow controller and was applied to a metal surface. The polyester resin had the following characteristic data:

|  | III |
|---|---|
| Softening point (Kofler) | 77–87° C. |
| Glass transition temperature | 55–60° C. |
| Melt viscosity DIN 53229, 160° C., cone/plate | 30–60 Pa · s |
| Acid value DIN 53402 | 30–36 mg KOH/g |

The stoving conditions were 5 minutes at 200° C., 8 minutes at 180° C. or 17 minutes at 165° C. (the temperatures shown relate to the object temperature).

C Acrylate/Blocked Isocyanate (Polyurethane Lacquer)

A powder lacquer was prepared as described in A from 65 parts by weight of a hydroxyfunctional acrylate resin (IV) (Crelan® VP LS 2995, a product of Bayer AG) and 35 parts by weight of a blocked isocyanate (V) (Crelan® VP LS 2007, a product of Bayer AG) with addition of 1 part by weight of flow controller and 0.3 part by weight of benzoin and was applied to a metal surface.

The resins had the following characteristic data:

|  | IV | V |
|---|---|---|
| Iodine value DIN 6162 |  |  |
| 50% in acetone | ≦2 | — |
| 60% in tetrahydrofuran | — | 2 |
| Hydroxyl content DIN 53240 | 2.4% | — |
| Acid value DIN 53402 | 15 | — |
| NCO content | — | 10% |

The stoving conditions were 15 minutes at 180° C. or 10 minutes at 200° C. (object temperature).

The flow controllers according to the Examples could be satisfactorily processed and remained free-flowing.

The clear lacquers obtained showed no signs of clouding, even in layer thicknesses of more than 100 μm.

The results of the flow tests are set out in the following Table.

TABLE

| Lacquer system | Additive | Evaluation | Clouding |
|---|---|---|---|
| A | — | 5 | No |
| Polyester/ | Ex. 1 | 3 | No |
| Epoxy | Ex. 3 | 1 | No |
|  | Ex. 7 | 4 | No |
|  | F 30 p mod | 1–2 | Yes |
| B | — | 5 | No |
| Polyester/ | Ex. 1 | 3 | No |
| TGIC | Ex. 2 | 3 | No |
|  | Ex. 3 | 1 | No |
|  | F 30 p mod | 1 | Yes |
| C | — | 5 | No |
| Polyacrylate/ | Ex. 2 | 1 | No |
| Isocyanate | Ex. 3 | 0–1 | No |
|  | F 30 p mod | 2–31 | Yes |

TGIC is tris-glycidyl isocyanurate
F 30 p mod is a solid flow controller based on a polyacrylate applied to SiO₂(Perenol F 30 p mod, Henkel KGaA).
Evaluation of Flow:
0 Excellent flow, substantially flat film surface
1 Good flow, slight texture
2 Moderate flow, orange-peel effect
3 As 2, occasional pinholes, slight depressions
4 Moderate flow, occasional craters, numerous pinholes
5 Poor flow, numerous craters Flow results in the 1 to 2 category are typical of powder lacquers and are accepted in industry.

We claim:

1. In a method wherein an additive is incorporated in a powder lacquer formation to control the flow properties of the powder lacquer during coating formation, the improvement which comprises: incorporating in the power lacquer formulation a composition containing at least one flow controller polymer containing at least one group selected from the group consisting of a) 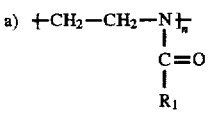

and b) 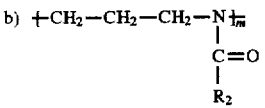

wherein $R_1$ and $R_2$ are independently hydrogen, an optionally hydroxysubstituted hydrocarbon group containing 1 to 36 carbon atoms, an aryl group, an aralkyl group optionally substituted on the aromatic nucleus, and a group of the formula $R_3$—(—$OC_2H_4$—)—$_p$O—$CH_2$— where $R_3$ is alkyl or alkenyl containing 1 to 18 carbon atoms, p is a number of 1 to 10, n and m, independently, are from 0 to 1000 with the sum of n and m being from 2 to 1000, and optionally containing additives typically encountered in powder lacquer formulations.

2. The method claimed in claim 1, wherein the polymer contains
50 to 100 mole-% of groups a) and
0 to 50 mole-% of groups b),
based on the total molar quantity of groups a)+b).

3. The method claimed in claim 1, wherein the substituents $R^1$ and $R^2$ are independently selected from the croup consisting of linear hydrocarbon groups containing 11 to 17 carbon atoms and phenyl groups.

4. The method claimed in claim 1, wherein the sum of the indices n+m is between 5 and 25.

5. The method claimed in claim 1, wherein the composition is a mixture containing
10 to 100% by weight of at least one flow controller polymer containing at least one group selected from The group consisting of group a) and b) and
0 to 90% by weight of additives,
based on the weight of The flow controller polymer.

6. A process for the production of flow controllers for powder lacquers, said flow controller containing polymers comprising at least one group selected from the group consisting of groups a) and b) of claim 1, which comprises: mixing at least one of oxazoline and oxazine monomers which form polymers containing at least one of a) or b), with a polymerization initiator to form a mixture and introducing the mixture into an extruder operated at a temperature in a range of 100° to 300° C., wherein the mixture is polymerized and the polymer is extruded.

7. The method of claim 1, wherein the polymer contains 100 mole % of the group

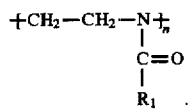

8. The method of claim 7, wherein for each group, $R_1$ is independently selected from linear hydrocarbon groups containing 11 to 17 carbon atoms and n has a value of 5 to 15.

9. The method of claim 3, wherein the sum of n and m is from 5 to 25.

10. The method claimed in claim 2, wherein the substituents $R^1$ and $R^2$ are independently selected from the group consisting of linear hydrocarbon groups containing 11 to 17 carbon atoms and phenyl groups.

11. The method claimed in claim 2, wherein the sum of n and m is from 6 to 25.

12. The method claimed in claim 2, wherein the composition is a mixture containing 10 to 100% by weight of at least one flow controller polymer containing at least one group selected from the group consisting of group a) and b) and 0 to 90% by weight of additives, based on the weight of the flow controller polymer.

13. The method of claim 2, wherein the polymer contains 100 mole % of the group

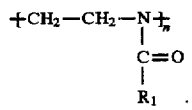

14. The method of claim 13, wherein for each group, $R_1$ is independently selected from linear hydrocarbon groups containing 11 to 17 carbon atoms and n has a value of 5 to 15.

15. The method claimed in claim 3, wherein the composition is a mixture containing 10 to 100% by weight of at least one flow controller polymer containing at least one group selected from the group consisting of group a) and b) and 0 to 90% by weight of additives, based on the weight of the flow controller polymer.

16. The method of claim 3, wherein the polymer contains 100 mole % of the group

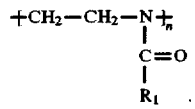

17. The method of claim 16, wherein for each group, $R_1$ is independently selected from linear hydrocarbon groups containing 11 to 17 carbon atoms and n has a value of 5 to 15.

18. The method of claim 5, wherein the polymer contains 100 mole % of the group

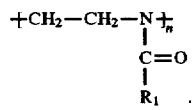

19. The method of claim 18, wherein for each group, $R_1$ is independently selected from linear hydrocarbon groups containing 11 to 17 carbon atoms and n has a value of 5 to 15.

* * * * *